United States Patent
Tsirkin et al.

(10) Patent No.: US 10,691,365 B1
(45) Date of Patent: Jun. 23, 2020

(54) DYNAMIC MEMORY LOCALITY FOR GUEST MEMORY

(71) Applicant: Red Hat, Inc., Raleigh, NC (US)

(72) Inventors: Michael Tsirkin, Westford, MA (US); Andrea Arcangeli, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/262,694

(22) Filed: Jan. 30, 2019

(51) Int. Cl.
*G06F 12/00* (2006.01)
*G06F 3/06* (2006.01)
*G06F 13/28* (2006.01)
*G06F 9/455* (2018.01)
*G06F 12/10* (2016.01)

(52) U.S. Cl.
CPC ............ *G06F 3/0647* (2013.01); *G06F 3/067* (2013.01); *G06F 3/0619* (2013.01); *G06F 3/0659* (2013.01); *G06F 3/0664* (2013.01); *G06F 9/45558* (2013.01); *G06F 12/10* (2013.01); *G06F 13/28* (2013.01); *G06F 2009/45583* (2013.01); *G06F 2212/1032* (2013.01); *G06F 2212/152* (2013.01); *G06F 2213/28* (2013.01)

(58) Field of Classification Search
CPC .... G06F 3/0647; G06F 3/0619; G06F 3/0659; G06F 3/0664; G06F 3/067; G06F 9/45558; G06F 12/10; G06F 13/28; G06F 2009/45583; G06F 2212/1032; G06F 2212/152; G06F 2213/28
See application file for complete search history.

(56) References Cited

U.S. PATENT DOCUMENTS

| 9,594,521 | B2 | 3/2017 | Blagodurov et al. |
| 9,753,861 | B2 | 9/2017 | Tsirkin et al. |
| 1,001,927 | A1 | 7/2018 | Tsirkin et al. |
| 2012/0254582 | A1 | 10/2012 | Ashok et al. |
| 2017/0249179 | A1* | 8/2017 | Tsirkin ................ G06F 9/45558 |
| 2017/0255484 | A1 | 9/2017 | Nakashima |

FOREIGN PATENT DOCUMENTS

CN  107807851 A  3/2018

OTHER PUBLICATIONS

Gauthier Voron, Efficient Virtualization of Numa Architectures, Sorbonne University, Mar. 8, 2018, http://www.mnesic.fr/~gvoron/research/thesis18manuscript.pdf.

* cited by examiner

*Primary Examiner* — Shawn X Gu
(74) *Attorney, Agent, or Firm* — Haynes and Boone, LLP

(57) ABSTRACT

A method of migrating memory includes protecting, by a hypervisor, a first memory page from write operations, the first memory page being used for direct memory access (DMA) by a device and stored at a guest memory address that maps to a first host-physical address. A second memory page is stored at the first host-physical address, and the device is allowed DMA in an input/output memory management unit (IOMMU). The method also includes allocating a third memory page at a second host-physical address and copying data stored at the second memory page to the third memory page. The method further includes updating a mapping including the guest memory address to reference the second host-physical address and detecting that the first memory page is protected from write operations by the device. The method further includes pinning the second memory page to main memory of the host machine and storing the mapping.

20 Claims, 7 Drawing Sheets

US 10,691,365 B1

DYNAMIC MEMORY LOCALITY FOR GUEST MEMORY

FIELD OF DISCLOSURE

The present disclosure generally relates to memory management, and more particularly to migrating memory from a first physical location to a second physical location.

BACKGROUND

A virtual machine is software that is executed on hardware to create a virtualization of a physical computer system. Virtual machines may function as self-contained platforms that run their own operating systems and software applications.

A host machine may concurrently run one or more virtual machines using software that is referred to as a hypervisor. The hypervisor allocates a certain amount of the host machine's resources, such as the host machine's underlying physical processors and memory devices, to each of the virtual machines. Each virtual machine may use the allocated resources to execute applications, including operating systems known as guest operating systems or guests. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines. The guests may transparently access the host machine's resources.

BRIEF SUMMARY

This disclosure relates to moving memory from a first physical location to a second physical location. Methods, systems, and techniques are provided for moving one or more pinned memory pages.

According to an example, a method of migrating memory includes protecting, by a hypervisor, a first memory page from write operations, the first memory page being part of guest memory including a guest memory address allocated to a guest running on a virtual machine, the first memory page being used for direct memory access (DMA) by a device assigned to the virtual machine and stored at the guest memory address that maps to a first host-physical address, a second memory page being stored at the first host-physical address, and the device is allowed DMA in an input/output memory management unit (IOMMU). The method also includes allocating a third memory page at a second host-physical address. The method further includes after protecting the first memory page from write operations, copying data stored at the second memory page to the third memory page. The method also includes updating a mapping including the guest memory address to reference the second host-physical address. The method further includes detecting that the first memory page is protected from write operations by the device. The method also includes pinning the second memory page to main memory of the host machine. The method further includes storing the mapping from the guest memory address to the first host-physical address.

According to another example, a system for migrating memory includes a memory manager protects a first memory page from write operations. The first memory page is part of guest memory including a guest memory address allocated to a guest running on a virtual machine, the first memory page is used for DMA by a device assigned to the virtual machine and stored at the guest memory address that maps to a first host-physical address, a second memory page is stored at the first host-physical address, and the device is allowed DMA in an input/output memory management unit (IOMMU). The memory manager allocates a third memory page at a second host-physical address, copies data stored at the second memory page to the third memory page, and updates a mapping including the guest memory address to reference the second host-physical address. Additionally, the memory manager detects that the first memory page is protected from write operations by the device, pins the second memory page to main memory of the host machine, and stores the mapping from the guest memory address to the first host-physical address.

According to another example, a non-transitory machine-readable medium includes a plurality of machine-readable instructions that when executed by one or more processors are adapted to cause the one or more processors to perform a method including: protecting, by a hypervisor, a first memory page from write operations, the first memory page being part of guest memory including a guest memory address allocated to a guest running on a virtual machine, the first memory page being used for DMA by a device assigned to the virtual machine and stored at the guest memory address that maps to a first host-physical address, a second memory page being stored at the first host-physical address, and the device is allowed DMA in an input/output memory management unit (IOMMU); allocating a third memory page at a second host-physical address; after protecting the first memory page from write operations, copying data stored at the second memory page to the third memory page; updating a mapping including the guest memory address to reference the second host-physical address; detecting that the first memory page is protected from write operations by the device; pinning the second memory page to main memory of the host machine; and storing the mapping from the guest memory address to the first host-physical address.

BRIEF DESCRIPTION OF THE DRAWINGS

The accompanying drawings, which form a part of the specification, illustrate examples of the disclosure and together with the description, further serve to explain the principles of the examples. In the drawings, like reference numbers may indicate identical or functionally similar elements. The drawing in which an element first appears is generally indicated by the left-most digit in the corresponding reference number. It should be appreciated that like reference numerals are used to identify like elements illustrated in one or more of the figures.

Figure 1:
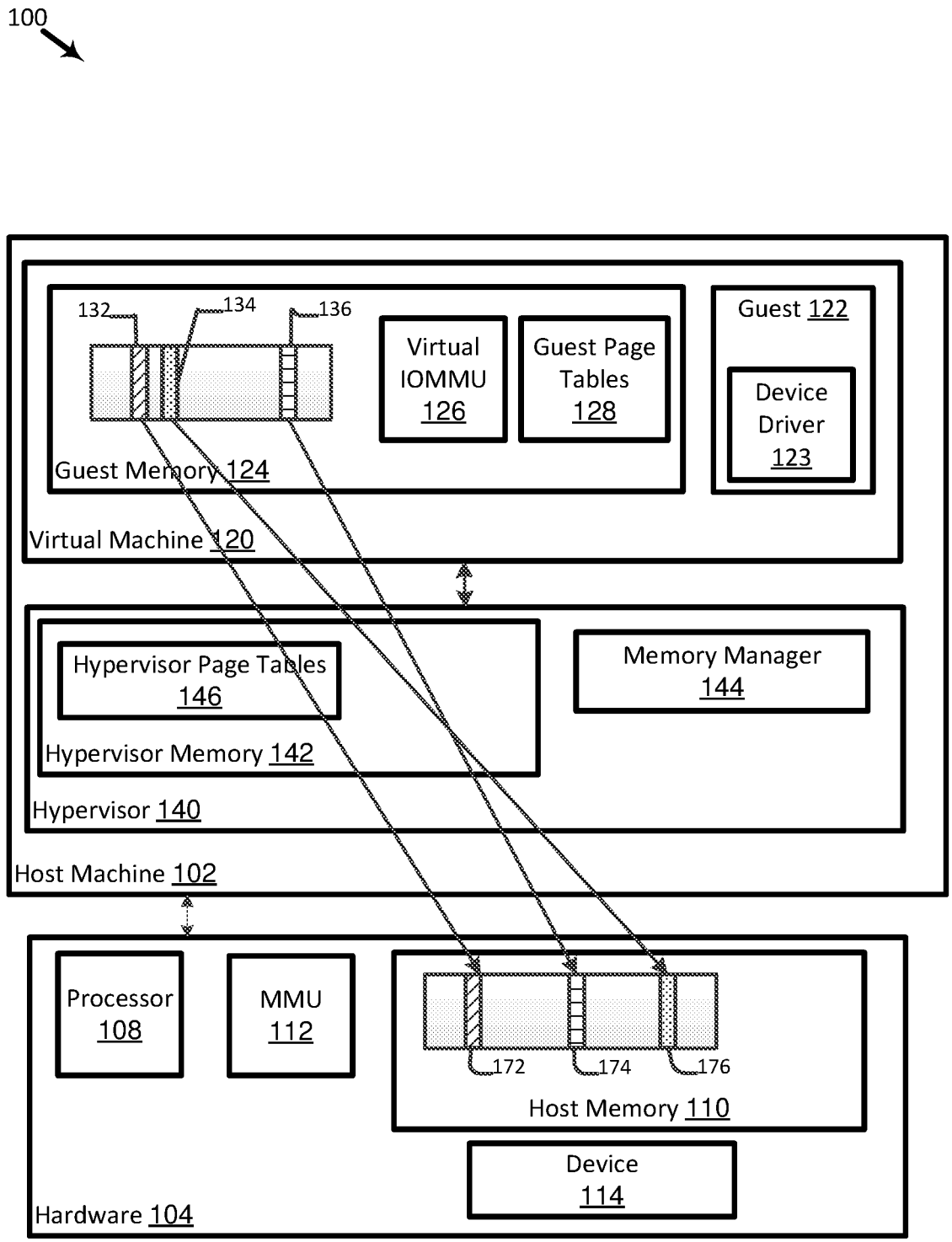
FIG. 1 depicts a computer system in accordance with one or more aspects of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A hypervisor may assign a device to a virtual machine running in a host machine. An assigned device is a physical device that is exposed to a guest as part of the virtual machine and may also be known as a pass-through device. Device assignment allows the guest running on the virtual machine to which the device is assigned to have direct access to the device. The overhead of virtualization is low because a big portion of the functionality for accessing the assigned device is running within the virtual machine. Accordingly, device assignment may result in faster performance compared to the guest accessing an emulated device.

Additionally, features such as zero-copy help reduce processor overhead by directly transferring data from sender memory to receiver memory without involving host processors. Direct memory access (DMA) typically allows a computer system to directly read or modify the memory of another computer system using "zero-copy," which refers to a memory allocation technique that provides computer systems with the ability to directly write data to and read data from memory.

Assigning a device to the virtual machine, however, may have some disadvantages when a memory region used by the device is used for DMA. The hypervisor pins a memory region used for DMA by passthrough devices. If memory is pinned, the pinned memory cannot be moved and stays allocated in random access memory (RAM). For example, the same virtual memory addresses associated with pinned memory consistently maps to the same physical memory addresses until the virtual machine or associated guest shuts down. If a memory page is not pinned, however, the memory page is not required to stay in the same memory location and may be moved to another memory location. Accordingly, the hypervisor may be unable to move pinned memory pages to another location.

A solution to the problem of the inability to move the aforementioned pinned memory pages to another location may include copying data from the pinned memory page to another memory page. In an example, a hypervisor may protect a guest memory page from write operations. In this example, the guest memory page may be part of guest memory including a guest memory address allocated to a guest running on a virtual machine, the guest memory page may be used for DMA by a device assigned to the virtual machine and stored at the guest memory address, and a first host memory page may be stored at a first host-physical address. The guest memory address may map to the first host-physical address, and the first host memory page allocated from the host memory may back up the guest memory page allocated from the guest memory. Additionally, the hypervisor may allocate a second host memory page at a second host-physical address and copy data stored at the first host memory page to the second host memory page. The initial mapping of the guest memory address to the first host-physical address may be updated to reference the second host-physical address, providing a mapping from the guest memory address to the second host-physical address.

Unless specifically stated otherwise, as apparent from the following discussion, it is appreciated that throughout the description, discussions utilizing terms such as "determining," "protecting," "sending," "receiving," "allocating," "copying," "replacing," "updating," "setting," "pinning," "identifying," "detecting," "storing," "allowing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 depicts a computer system 100 in accordance with one or more aspects of the present disclosure. A "computer system" herein shall refer to a system including one or more processors and one or more memory devices. The computer system 100 includes a host machine 102 coupled to hardware 104. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media. Additionally, the host machine 102 may be communicatively coupled to a network (not shown) that communicates data between the host machine 102 and another machine. For example, the network may transmit data corresponding to one or more virtual machines from the host machine 102 to the other machine. The network may include one or more public and/or private networks, which may each include network devices that transfer data via wired and/or wireless transmission media.

The hardware 104 includes a processor 108, a host memory 110, a memory management unit (MMU) 112, and one or more devices A "processor" or "physical processor" herein shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single-core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). The processor 108 executes instructions for performing the operations, steps, and/or actions discussed herein.

The host memory 110 included in the hardware 104 is structured to include at least one computer-readable storage medium on which is stored one or more sets of instructions (e.g., software) embodying any one or more of the methodologies or functions described herein. The host memory 110 is divided into host-physical addresses that are portioned into fixed-length blocks of memory that compose memory pages. A memory page may be a fixed-length contiguous block of virtual memory (e.g., 4 Kilobytes), described by a single entry in a page table. Each stored row of a page table is called a page table entry. The host memory 110 may also be referred to as main memory, physical memory, or host-physical memory. Additionally, a host memory page may also be referred to as a physical memory page or a host-physical memory page. The host-physical addresses may refer to the memory that is visible to the hypervisor 140 as available on the system 100.

The host memory 110 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and/or actions of the methods described herein may be implemented using corresponding machine-readable instructions stored on or in a non-transitory machine-readable medium that are executable by the processor 108.

The processor 108 and the host memory 110 may be communicatively coupled via one or more buses (e.g., a PCI bus) and/or integrated into a motherboard of the host machine 102. The hardware 104 may include other hardware elements, such as a video display unit (e.g., a liquid crystal display (LCD) monitor), alphanumeric input device (e.g., a keyboard), cursor control device (e.g., a mouse), signal generation device (e.g., a speaker), a network interface card (NIC), wireless adapter card, audio/sound card, graphics card, storage adapter, and/or other hardware device. The MMU 112 uses page tables to map virtual addresses to host-physical address. Although the MMU 112 is shown as separate from the processor 108, in other examples the MMU 112 may be a hardware component that is part of the processor 108.

The computer system 100 includes a virtual machine 120 that is provided by a hypervisor 140. One or more virtual machines 120 may run services or applications. The hypervisor 140 is structured with executable instructions that are stored in the host memory 110 and executed by the processor 108 to provide one or more virtual machines. The hypervisor 140 is structured to provide the virtual machine 120 by virtualizing at least a portion of the hardware 104. The hypervisor 140 manages system resources, including providing guests (e.g., guest applications such as operating system (OSs), kernels, user applications, and so forth) of the virtual machine 120 access to the hardware 104, such as the processor 108, the host memory 110, and the device 114. The host machine 102 may run multiple OSs, concurrently and in isolation from other programs on a single system. The virtual machine 120 includes a guest 122, which executes a device driver 123 that communicates with the hardware devices. The guest 122 may run a different OS than the host machine 102. The host OS or the guest 122 may include, for example, MICROSOFT® WINDOWS®, LINUX®, SOLARIS®, and MAC® OS. Trademarks are the property of their respective owners. In some examples, the hypervisor 140 is structured to run on top of a host OS and/or kernel. In other examples, the hypervisor 140 is run directly on the hardware 104 without the use of a separate OS or kernel. Although one virtual machine is illustrated as running on hypervisor 140, the hypervisor 140 may provide a plurality of virtual machines.

The virtual machine 120 is structured with a guest memory 124 that is divided into memory pages, which may facilitate the management of the guest memory 124. The guest 122 (e.g., a guest kernel, guest, and/or other application) running on the virtual machine 120 or a device assigned to the virtual machine 120 may access the guest memory addresses provided by the guest memory 124 to read, write, and/or execute data. The guest memory 124 includes guest memory pages 132, 134, and 136, although the guest memory 124 may include fewer or considerably more memory pages. The hypervisor 140 is structured to provide the guest memory 124 by allocating a portion of the host memory 110 using hypervisor page tables 146 stored in a hypervisor memory 142. The host memory 110 includes host memory pages 172, 174, and 176, although the host memory 110 may include fewer or considerably more memory pages. Guest memory pages are mapped to memory pages in the host memory 110.

The hypervisor 140 includes a memory manager 144 that maintains entries in the hypervisor page tables 146. The hypervisor page tables 146 stores entries that map one or more ranges of the host-physical memory addresses into one or more guest memory address ranges that are assigned to the virtual machine 120 as the guest memory 124. The guest-physical memory refers to the memory that is visible to the guest 122 running in the virtual machine 120. The guest-virtual memory refers to a continuous virtual address space presented by the guest 122 to one or more applications (not shown). The guest-virtual memory is the memory that is visible to the one or more applications running on the virtual machine 120.

The guest memory 124 may be structured with guest page tables 128 that provide another layer of memory address mappings. The guest page tables 128 and the hypervisor page tables 146 translate the guest-virtual memory addresses to host-physical memory addresses using their page table mappings. Accordingly, the guest 122 is provided read, write, and/or execute access to data stored in the host memory 110. The guest page tables 128 maps one or more ranges of guest-virtual memory addresses to the guest-physical addresses provided by the hypervisor page tables 146. Accordingly, the guest-virtual memory addresses are mapped to guest-physical memory addresses by the guest page tables 128, and the guest-physical memory addresses are mapped to the host-physical memory addresses by the hypervisor page tables 146. Thus, memory pages in the guest memory 124 may include one or more guest-virtual memory addresses that map to host-physical memory addresses by way of the guest page tables 128 and the hypervisor page tables 146. A guest memory address may refer to a guest-virtual memory address or a guest-physical memory address.

A guest memory page is stored at a guest memory address, and a host memory page is stored at a host-physical address. A guest memory page corresponds to a host memory page if the guest memory page maps to the host memory page, and vice versa. In the example illustrated in FIG. 1, the patterns shown in the memory pages represent data stored in the memory pages, and an arrow from a guest memory page to a host memory page indicates the host memory page that backs up the guest memory page. In an example, the hypervisor page tables 146 store an entry of a mapping from a guest memory address of the guest memory page 132 to a host-physical address of the host memory page 172, an entry of a mapping from a guest memory address of the guest memory page 134 to a host-physical address of the host memory page 176, and an entry of a mapping from a guest memory address of the guest memory page 136 to a host-physical address of the host memory page 174.

A mapping of a guest memory address to a host-physical address refers to a mapping of a guest memory page to a host physical memory page, where the guest memory page is stored at the guest memory address and the host physical memory page is stored at the host-physical address. Accordingly, the guest memory page 132 is mapped to the host memory page 172, the guest memory page 134 is mapped to the host memory page 176, and the guest memory page 136 is mapped to the host memory page 174. If the guest 122 or the device 114 accesses the guest memory page 132, it is accessing the host memory page 172.

The hypervisor 140 may assign the device 114 to the virtual machine 120 and provide the guest 122 running on the virtual machine 120 with access to the device 114. In an example, the guest memory pages 132, 134, and 136 are used for direct memory access (DMA) by the device 114 and correspond to host-physical addresses of host memory page 172, 176, and 174, respectively. When the device 114 is assigned to the virtual machine 120, the device driver 123 is specific to the device 114. The guest 122 as part of the virtual machine 120 may execute the device driver 123 that communicates directly with the assigned device 114 without mediation from the hypervisor 140. In an example, the device 114 is a NIC, and the guest 122 may bypass the hypervisor 140 and directly access the assigned device 114 (e.g., to receive and send data over a network). The guest 122 and the assigned device 114 may communicate via a memory region including guest memory pages 132, 134, and 136 in the guest memory 124. If a device accesses a guest memory page, the device accesses the host memory page corresponding to the guest memory page.

The guest memory 124 includes a virtual IOMMU 126 that may protect portions of memory from access by devices (e.g., device 114). The guest 122 may program the virtual IOMMU 126 to allow the device 114 access to particular memory regions and to enforce memory protection controls on DMA operations of its I/O devices. Accordingly, the virtual IOMMU 126 limits where particular devices may access the guest memory 124 and enables the guest 122 to restrict the device 114's DMAs to specific physical memory locations. A page table entry in the virtual IOMMU 126 specifies access permissions (e.g., permission bits) for what a device can and cannot do with a particular memory page. Access permissions may include write, write-only, read, read-only, and/or execute permissions for a memory region. The permission bits may specify whether the device may perform read, write, and/or execute (execution permission indicates that page binary data may be executed as machine code in the same way as programs are executed) operations on the page. In an example, the guest 122 may program a device DMA. The virtual IOMMU 126 may interpret a target address of the DMA as an I/O virtual address and attempt to translate it to a physical address using per-device address translations (or mappings) previously installed by the guest 122. If a translation exists, the DMA is routed to the correct host-physical address; otherwise, it is blocked.

Figure 2:
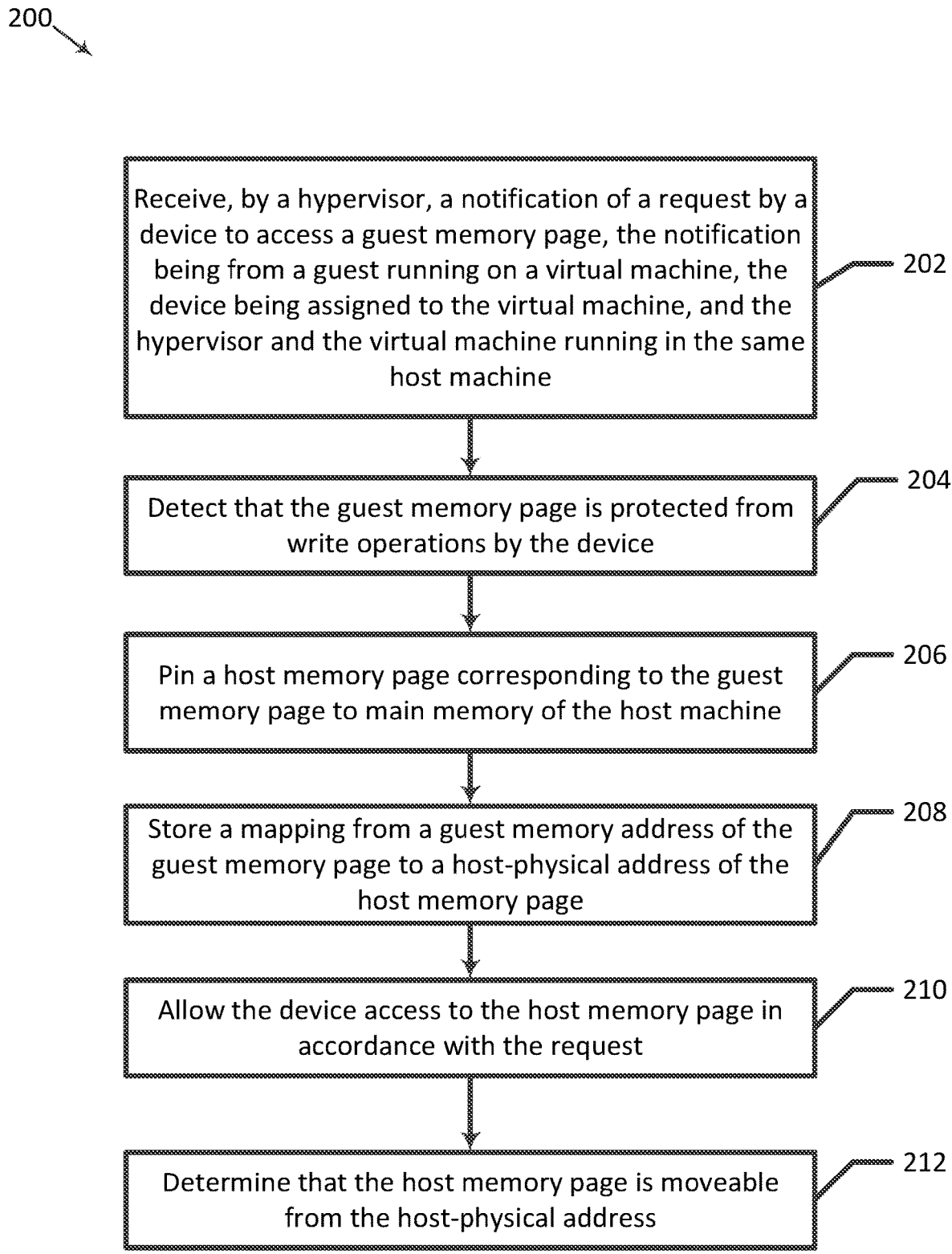
FIG. 2 is a flowchart illustrating a method of processing a memory access request by a device in accordance with one or more examples.

FIG. 2 is a flowchart illustrating a method 200 of processing a memory access request by the device 114 in accordance with one or more examples. Method 200 is not meant to be limiting and may be used in other applications. At action 202, the hypervisor 140 receives a notification of a request by the device 114 to access the guest memory page 132, the notification being from the guest 122 running on the virtual machine 120, the device 114 being assigned to the virtual machine 120, and the hypervisor 140 and the virtual machine 120 running in the same host machine 102. The guest 122 may modify the virtual IOMMU 126 to include entries specifying the device 114's access permissions to a memory region including the guest memory page 132. The guest 122 may receive the memory access request from the device 114 and in response, modify one or more entries in the virtual IOMMU 126 in accordance with the memory access request. If the guest 122 receives a request from the device 114 to read the guest memory page 132, the guest 122 may program an entry into the virtual IOMMU 126 specifying that the device 114 has read-only access to the guest memory page 132. For example, the guest 122 may send a command (e.g., an invalidate command) to notify the hypervisor 140 about the memory access request. The memory manager 144 may receive the command, which the memory manager 144 processes as the notification of the memory access request. The virtual IOMMU 126 may be used to detect that the device 114 has read-only access to guest memory (e.g., the guest memory page 132). The memory manager 144 may determine that the device has read-only access to a particular memory page by examining page table entries of the virtual IOMMU 126 and determining whether the page table entries indicate that the driver does not have write access to the particular memory page. Access permissions may include write, write-only, read, read-only, and/or execute permissions for a memory region. The permission bits may specify whether the device may perform read, write, and/or execute operations on the page.

At action 204, the memory manager 144 detects that the guest memory page 132 is protected from write operations by the device 114. A memory page is protected from write operations by a device if the device does not have write permissions to the memory page. In response to receiving the notification, the memory manager 144 may read an entry stored in the virtual IOMMU 126, the entry specifying whether the device 114 has permission to modify the guest memory page 132. In some examples, the memory manager 144 maintains a physical IOMMU (not shown) that mirrors the data stored in the virtual IOMMU 126. For example, the memory manager 144 may copy the entries stored in the virtual IOMMU 126 into the physical IOMMU. The memory manager 144 may detect, based on the entries in the virtual IOMMU 126 or the physical IOMMU, whether the guest memory page 132 (or the host memory page 172 corresponding to the guest memory page 132) is protected from write operations by the device 114. Because the guest 122 controls access to the memory region, the memory manager 144 may detect whether the memory region is modifiable by a device by analyzing entries in the virtual IOMMU 126, without understanding how the device driver 123 operates.

At action 206, the memory manager 144 pins the host memory page 172 corresponding to the guest memory page 132 to main memory of the common host machine, such that the host memory page 172 is not moved to another physical memory location within the main memory or swapped out to disk.

At action 208, the memory manager 144 stores a mapping from a guest memory address of the guest memory page 132 to a host-physical address of the host memory page 172. The guest memory page 132 is backed by the host memory page 172. In an example, the memory manager 144 stores the mapping in the MMU 112. Accordingly, the MMU 112 translates the guest memory address of the guest memory page 132 to the host-physical address of the host memory page 172.

At action 210, the memory manager 144 allows the device 114 access to the host memory page 172 in accordance with the request. At action 212, the memory manager 144 determines that the host memory page 172 is moveable from the host-physical address. The memory manager 144 may make this determination even if the memory manager 144 has pinned the host memory page 172.

It is understood that additional processes may be performed before, during, or after actions 202-212 discussed above. It is also understood that one or more of the actions of the method 200 described herein may be omitted, combined, or performed in a different sequence as desired. For example, action 212 may be performed before action 210. In another example, in response to detecting that the device 114 has read-only permission for accessing the guest memory page 132, the memory manager 144 sets a flag corresponding to the guest memory page 132's entry in MMU 112. The flag may indicate that the guest memory page 132 is backed by a pinned host memory page, and the memory manager 144 may detect the flag in an entry including the guest memory address of the guest memory page 132. The flag may specify to the memory manager 144 how to migrate memory if the guest memory page 132 is backed by a pinned host memory page.

Figure 3A:
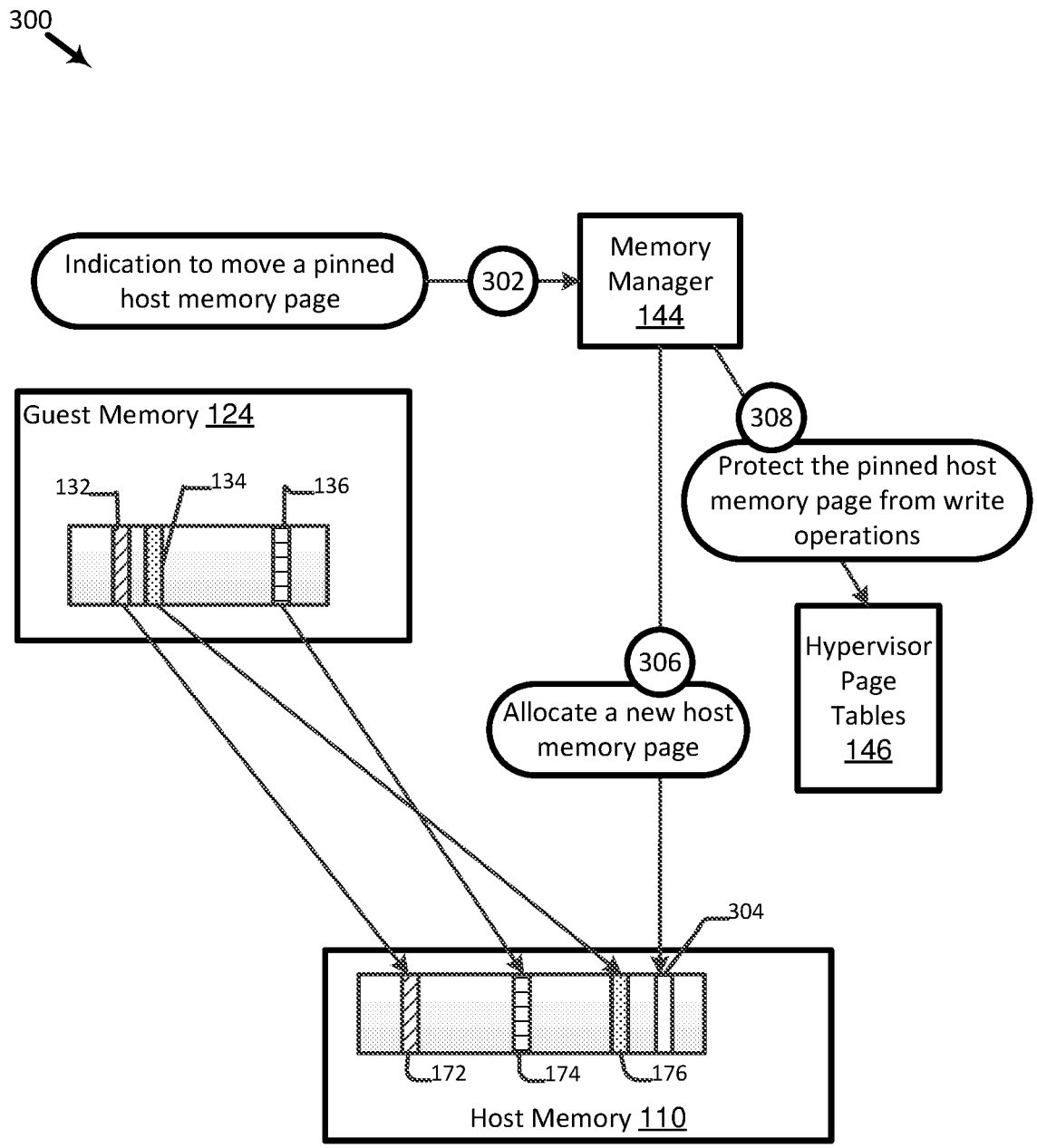
FIGS. 3A and 3B illustrate a process flow of migrating memory in accordance with one or more aspects of the present disclosure.
Figure 3B:
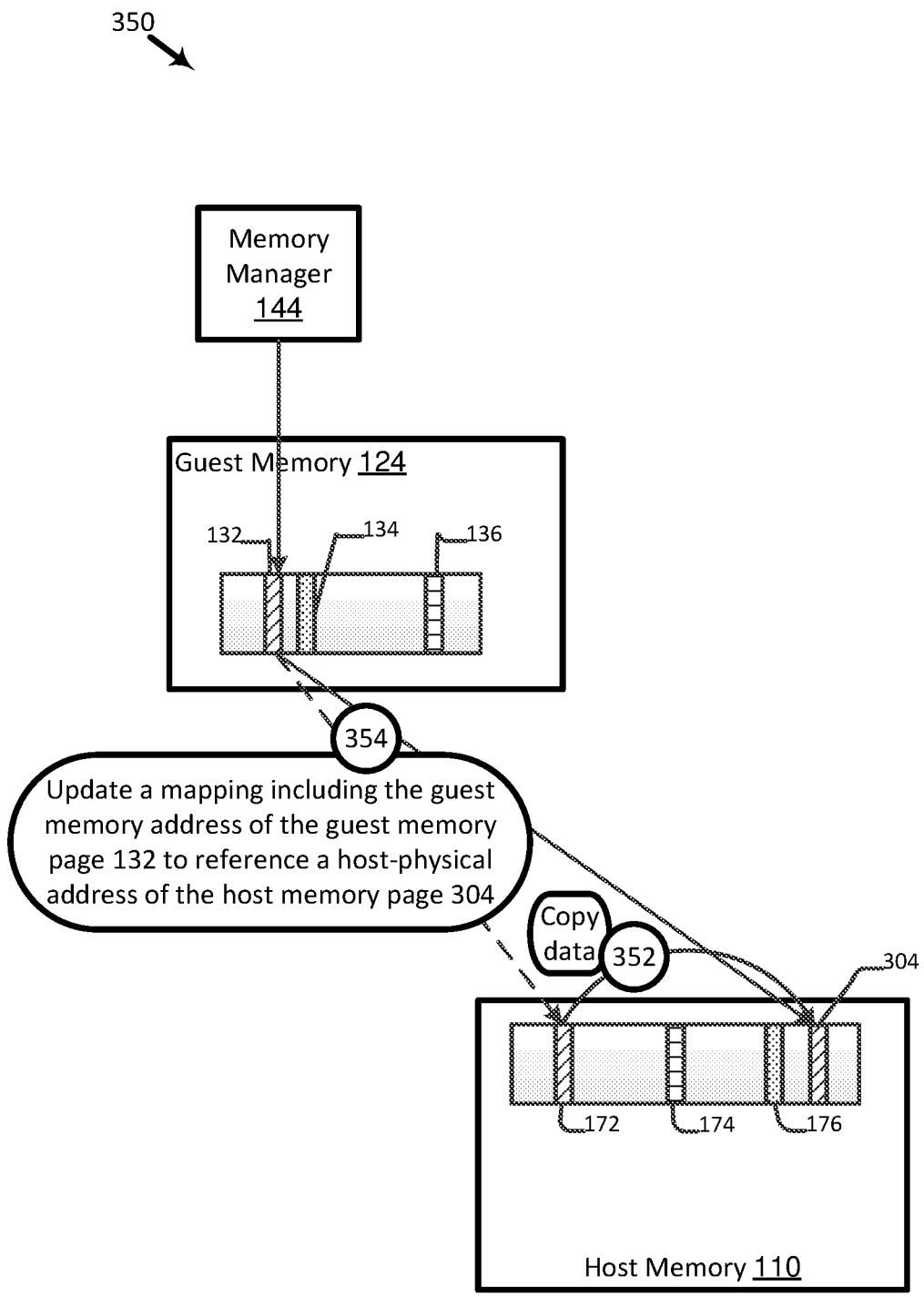

FIGS. 3A and 3B illustrate a process flow 300, 350 of memory migration in accordance with one or more aspects of the present disclosure. In keeping with the actions illustrated in FIG. 2, the memory manager 144 may pin the host memory pages 172, 174, and 176 to the main memory. Referring to action 212 of method 200, the host memory page 172 may be stored at a host-physical address, and the memory manager 144 may determine that the host memory page 172 is moveable from the host-physical address. Additionally, after action 212 of method 200, the memory manager 144 may proceed to action 302 in FIG. 3.

At action 302, the memory manager 144 may receive an indication to move a pinned host memory page. In an example, the memory manager 144 receives the indication in response to receiving an explicit request (e.g., from an administrator) to move the host memory page 172.

At action 306, in response to receiving the indication to move the pinned host memory page, the memory manager 144 allocates a new host memory page 304 in the host memory 110. In an example, the pinned host memory page is host memory page 172, and the host memory page 304 is stored at a different host-physical address than the host memory page 172. The memory manager 144 may determine whether the host memory page 172 is writeable.

If so, at action 308, the memory manager 144 protects the host memory page 172 from write operations. In an example, the memory manager 144 protects the host memory page 172 from write operations by modifying permissions associated with the host memory page 172 in the hypervisor page tables 146. For example, the memory manager 144 may set the permissions associated with the host memory page 172 as read-only or read- and execute-only. Accordingly, the host memory page 172 is not modifiable by a processor. After action 308, the memory manager 144 may determine that the host memory page 172 is not modifiable by the device 114 or by a processor. The device 114 may be able to read the host memory page 172, but may be restricted from modifying the host memory page 172.

In FIG. 3B, at action 352, the memory manager 144 copies data stored at the host memory page 172 to the host memory page 304, as shown by the arrow from the host memory page 172 to the host memory page 304. After action 352, the data stored at host memory page 172 and host memory page 304 are the same.

At action 354, the memory manager 144 updates a mapping including the guest memory address of the guest memory page 132 to reference a host-physical address of the host memory page 304. In an example, the memory manager 144 searches for an entry including the guest memory address in the MMU 112, where the entry stores a mapping from the guest memory address of the guest memory page 132 to a host-physical address of the host memory page 172. The host memory page 172 is pinned to main memory. The memory manager 144 may update the mapping in the MMU 112 by replacing the host-physical address of the host memory page 172 with the host-physical address of the host memory page 304. The line segment connecting the guest memory page 132 and the host memory page 172 is shown with a dashed pattern to illustrate that the associated mapping is invalid in the MMU 112 after action 354 has been completed. A solid line segment connecting the guest memory page 132 and the host memory page 304 illustrates that the associated mapping is valid in the MMU 112 after action 354 has been completed. In an example, the hypervisor 140 issues a command to the MMU 112 to update the mapping to reference the host-physical address of the host memory page 304. If the MMU 112 has previously cached entries including the invalid mappings, the hypervisor 140 may invalidate the applicable cached entries.

It is understood that additional processes may be performed before, during, or after the actions discussed above. It is also understood that one or more of the actions of the process flow 300, 350 described herein may be omitted, combined, or performed in a different sequence as desired. For example, after action 354, the memory manager 144 may modify the permissions of the host memory page 172 such that it is writable. In another example, after action 352 and before action 354, the memory manager 144 may protect the host memory page 304 from write operations and/or block the virtual memory 120 from writing to the host memory page 304, and after action 354, the memory manager 144 may permit write operations to the host memory page 304 and/or unblock the virtual memory 120 from modifying the host memory page 304. In another example, after action 354, the memory manager 144 may free the host memory page 172 for usage by another component (e.g., host machine, application, guest, and/or service).

If the guest 122 attempts to modify the host memory page 172 before action 354 has been completed, the memory manager 144 may perform various actions. In some examples, the memory manager 144 blocks the guest 122 from modifying the host memory page 172 until the mapping has been completely updated. In some examples, if the host memory page 172 has not been reused and the host memory page 304 has not been made writable, the hypervisor 140 may allow the guest 122 to modify the host memory page 172 and the data stored in the host memory page 304 may be marked as invalid or discarded. The host memory page 172 may continue to be used by the guest 122 and the memory manager 144 determines to cancel the memory migration (e.g., does not update the mapping).

FIGS. 3A and 3B illustrate the host memory pages 172 and 304 being on the same host machine 102 or the same node. A "node" herein refers to a group of one or more processors and one or more associated memory devices locally accessible by the processors in the group. The memory manager 144 may desire to allocate the host memory page 304 in the same node or system as the host memory page 172 for compaction purposes. The memory manager 144 may perform memory migration in the same node to arrange memory pages in a physically contiguous manner. As a result, a large number of memory pages may be both physically and virtually configured and used as a "huge single page," which may be described as a compact page table data structure that provides for processor efficiency.

It should be understood that in other examples, host memory pages 172 and 304 may be located on different nodes. For example, a pinned host memory page may be stored at a first node, and the memory manager 144 may detect access to the pinned host memory page from a second node different from the first node. In this example, the memory manager 144 may receive the indication to move the pinned host memory page in response to detecting access to the pinned host memory page from the second node. The first and second nodes may be represented by Non-Uniform Memory Access (NUMA) nodes. In some examples, a NUMA node may be considered a computer system.

Figure 4:
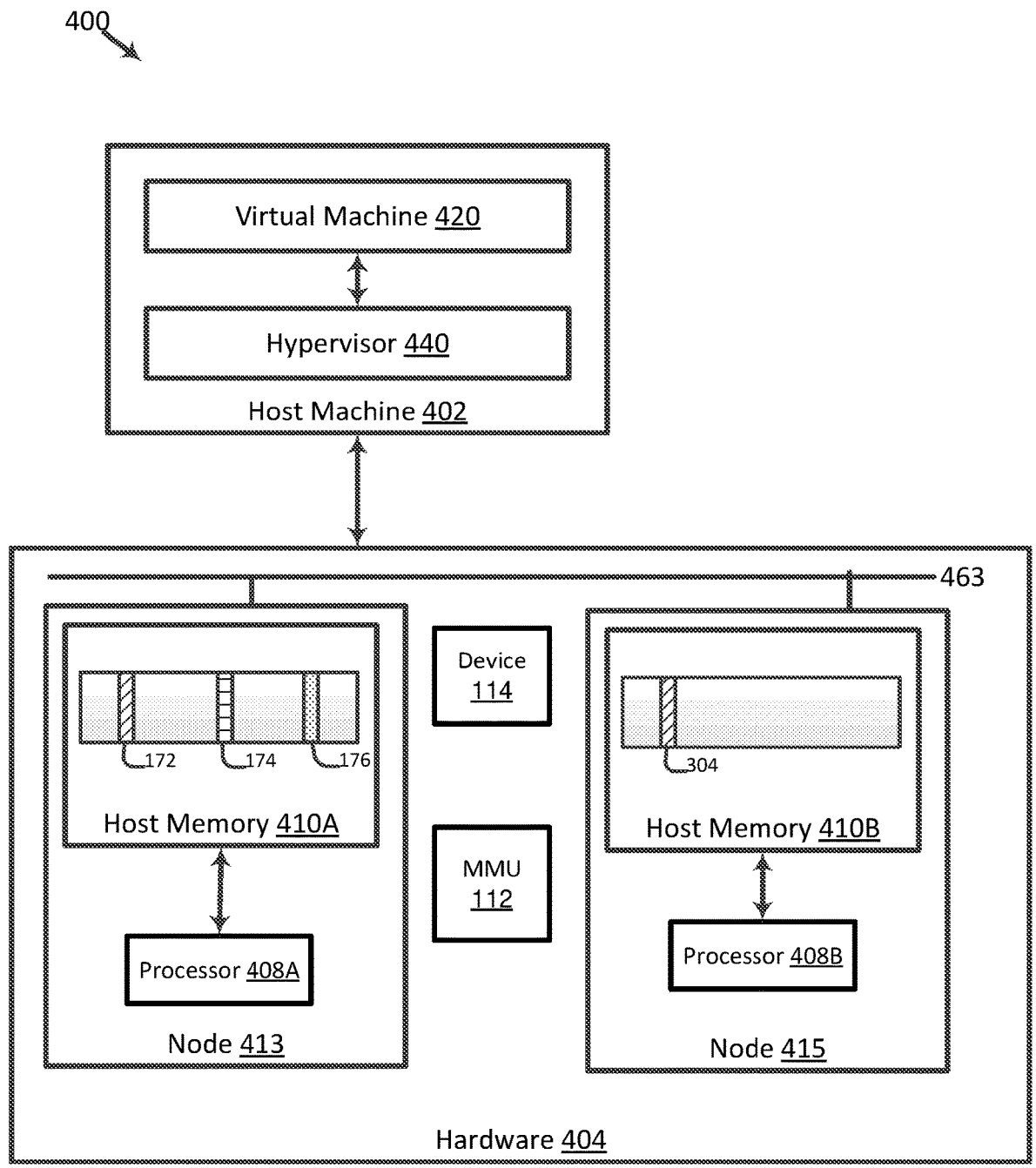
FIG. 4 depicts a computer system in accordance with one or more aspects of the present disclosure.

FIG. 4 depicts a computer system 400 in accordance with one or more aspects of the present disclosure. The computer system 400 includes a host machine 402 coupled to hardware 404. A virtual memory 420 and a hypervisor 440 run in the host machine 402. The computer system 400 also includes nodes 413 and 415. In some implementations, the computer system 400 supports the NUMA architectural model, according to which a physical processor of a multi-processor computer system may be directly connected to some memory devices while being indirectly connected (e.g., via other processors) to some other memory devices. A NUMA system may be characterized by the system topology information including memory access latency values for one or more processors accessing memory pages residing on various memory devices. For example, in a NUMA system, some regions of memory are on physically different buses from other regions. Herein, "local" memory access refers to a memory access via a local bus (e.g., PCI bus) and is accessed by a processor on the same NUMA node. Additionally, "foreign" memory access refers to a memory access via other devices such as other processors and/or system area networks and is accessed by a processor on a different NUMA node.

Each node 413, 415 may be a NUMA node including a host memory 410A, 410B and one or more processors 408A, 408B. Local connections within each node, including the connections between a processor 408A and the memory 410A, may be provided by one or more local buses of suitable architecture. In some examples, NUMA node 413 includes host memory 410A with a local memory bus to processor(s) 408A. Similarly, NUMA node 413 includes host memory 410B with a local memory bus to processor(s) 408B. NUMA nodes may be coupled to each other via a system interconnect crossbar/switch 463. In an example, accessing "foreign" memory may be expensive because the request leaves one NUMA node (e.g., node 413) and traverses system interconnect crossbar/switch 463 to get to another NUMA node (e.g., node 415) that holds the required information in its memory.

In FIG. 4, the host memory page 172 is located on node 413, and the memory manager 144 may allocate the host memory page 304 on node 415 rather than on node 413. The memory manager 144 may detect the indication to move a pinned host memory page 172 by determining that the host memory page 172 is being accessed by a processor 408B that is closer to the host memory 410B in the node 415. Accordingly, the memory manager 144 may determine to move the host memory page 172 to the host memory 410B in node 415. The memory manager 144 may use various techniques to determine "closeness" of a processor to a memory, such as counters or a timer.

Figure 5:
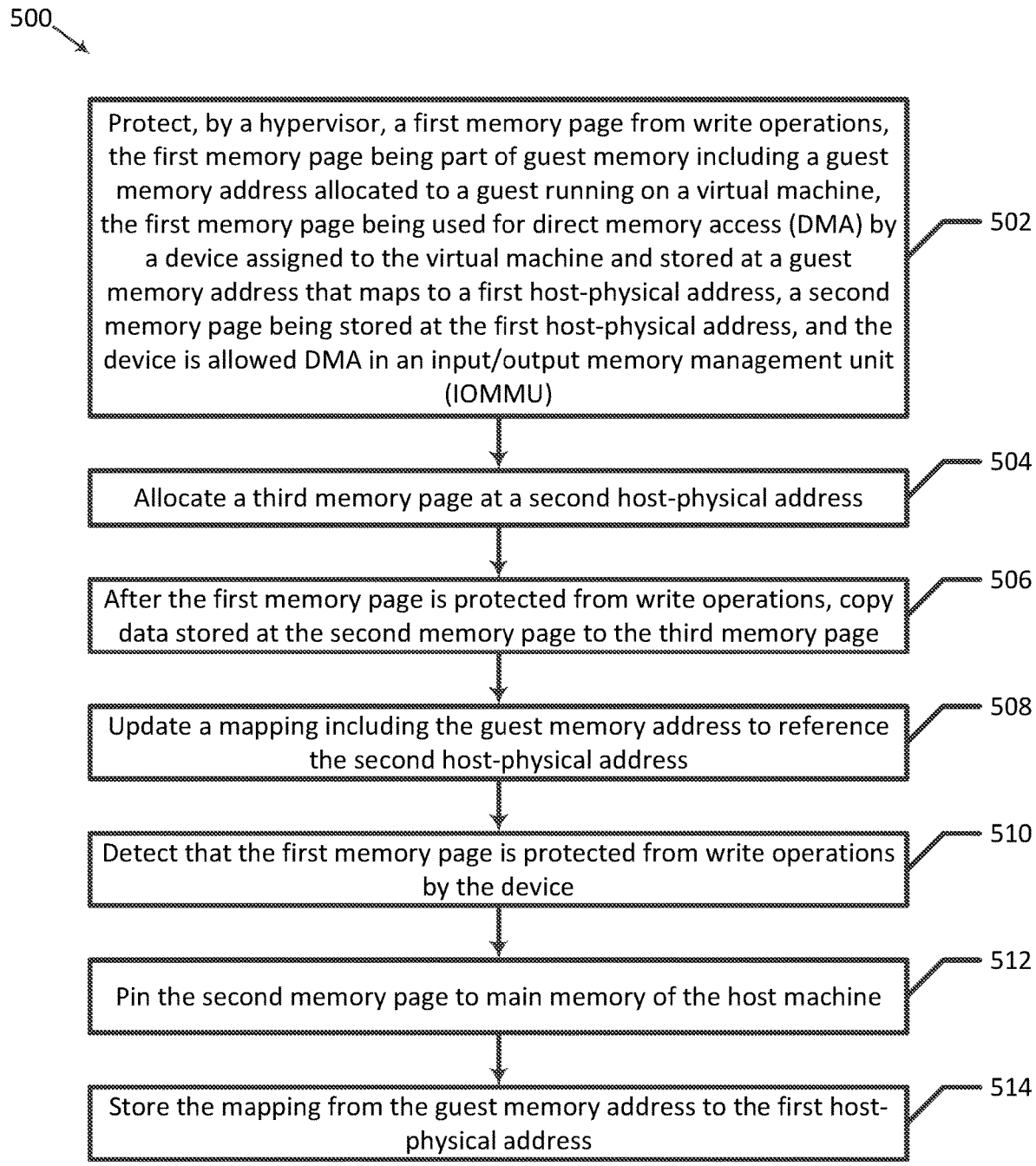
FIG. 5 is a flowchart illustrating a method of migrating memory in accordance with one or more aspects of the present disclosure.

FIG. 5 is a flowchart illustrating a method 500 of migrating memory in accordance with one or more aspects of the present disclosure. Method 500 is not meant to be limiting and may be used in other applications. At action 502, the memory manager 144 protects a first memory page from write operations, the first memory page being part of guest memory including a guest memory address allocated to a guest running on a virtual machine, the first memory page being used for direct memory access (DMA) by a device assigned to the virtual machine and stored at the guest memory address that maps to a first host-physical address, a second memory page being stored at the first host-physical address, and the device is allowed DMA in an IOMMU. In an example, the first memory page is the guest memory page 132, and the second memory page is the host memory page 172.

At action 504, the memory manager 144 allocates a third memory page at a second host-physical address. In some examples, the third memory page is the host memory page 304. In an example, the memory manager 144 may allocate the third memory page on the same node as the second memory page. In another example, the memory manager 144 may allocate the third memory page on a node different from the node storing the second memory page.

At action 506, after the first memory page is protected from write operations, the memory manager 144 copies data stored at the second memory page to the third memory page. The memory manager 144 may protect the first memory page from write operations by setting permissions of the first memory page to read-only or read-and-execute only (if not done already).

At action 508, the memory manager 144 updates a mapping including the guest memory address to reference the second host-physical address. In an example, the MMU may store an entry including a mapping from the guest memory address of the first memory page to the host-physical address of the second memory page. The memory manager 144 may update the mapping by replacing the host-physical address of the second memory page with the host-physical address of the third memory page. Accordingly, if the guest desires to access the first memory page, the guest will access the third memory page rather than the second memory page.

At action 510, the memory manager 144 detects that the first memory page is protected from write operations by the device. At action 512, the memory manager 144 pins the second memory page to main memory of the host machine. At action 514, the memory manager 144 stores the mapping from the guest memory address to the first host-physical address.

In some examples, one or more actions 502-514 may be performed for any number of host memory pages that are migrated to another host-physical address. It is understood that additional processes may be performed before, during, or after actions 502-514 discussed above. It is also understood that one or more of the actions of method 500 described herein may be omitted, combined, or performed in a different sequence as desired. For example, the memory manager 144 may locate mappings associated with the first memory page. If the mappings associated with the first memory page are already read-only mappings, the memory manager 144 may skip modifying the mappings. If the mappings are not read-only mappings, the memory manager 144 may modify the mappings to be read-only mappings.

Figure 6:
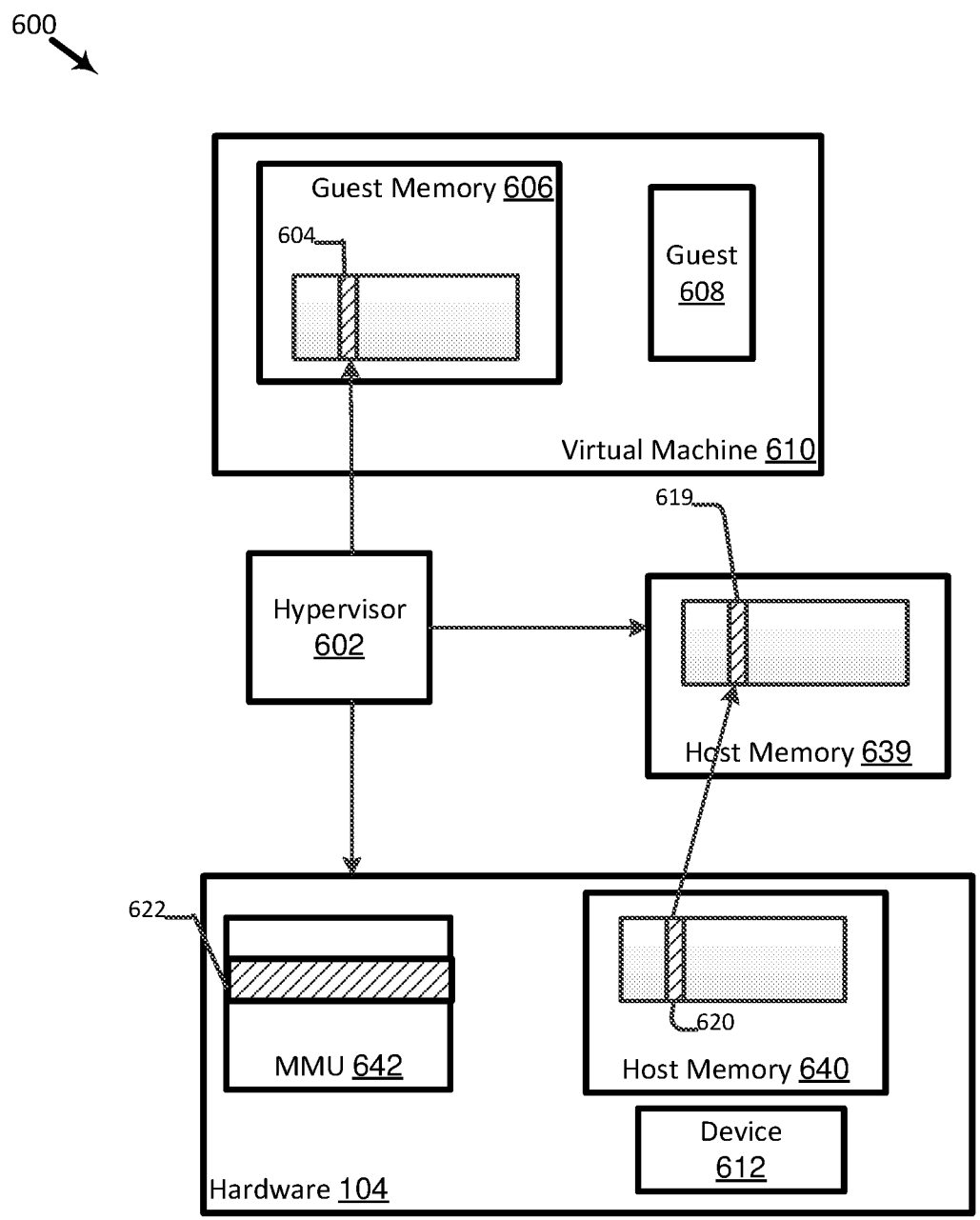
FIG. 6 depicts a block diagram in accordance with one or more aspects of the present disclosure.

FIG. 6 depicts a block diagram 600 in accordance with one or more aspects of the present disclosure. In the example illustrated in FIG. 6, a hypervisor 602 protects a first memory page 604 from write operations, the first memory page 604 being part of guest memory 606 including a guest memory address allocated to a guest 608 running on a virtual machine 610, the first memory page 604 being used for DMA by a device 612 assigned to the virtual machine 610 and stored at the guest memory address that maps to a first host-physical address, and a second memory page 620 being stored at the first host-physical address. The second memory page 620 in host memory 640 backs up the first memory page 604, and an MMU 642 stores a mapping 622 including the guest memory address. In an example, the mapping 622 includes the guest memory address of the first memory page 604 to the first host-physical address of the second memory page 620.

The hypervisor 140 allocates a third memory page 619 at a second host-physical address in host memory 639. In an example, the host memory 639 and the host memory 640 are on the same node and have the same host memory address space. The first host-physical address may be on the same node as or on different node from the second host-physical address. In another example, the host memory 639 and the host memory 640 are on different nodes, and the first host-physical address is located on a different node from the second host-physical address.

After protecting the first memory page 604 from write operations, the hypervisor 602 copies data stored at the second memory page 620 to the third memory page 619. The hypervisor 602 updates a mapping 622 including the guest memory address to reference the second host-physical address of the host memory page 619. The mapping 622 may be stored in the MMU 642.

As discussed above and further emphasized here, FIGS. 1, 2, 3A, 3B, 4, 5, and 6 are merely examples, which should not unduly limit the scope of the claims.

A computer system may be suitable for implementing one or more examples of the present disclosure. In various implementations, the computer system may include a client or a server computing device. The client or server computing device may include a plurality of processors 108. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The computer system may include a bus or other communication mechanism for communicating information data, signals, and information between various components of the computer system. Components include an input/output (I/O) component that processes a user action, such as selecting keys from a keypad/keyboard, selecting one or more buttons or links, etc., and sends a corresponding signal to the bus. The I/O component may also include an output component such as a display, and an input control such as a cursor control (such as a keyboard, keypad, mouse, etc.). In an example, a user may use the I/O component and cause a device to request access to a guest memory page 132. Additionally, the device may be assigned to the virtual machine 120.

A transceiver or network interface transmits and receives signals between the computer system and other devices via a communication link to a network. In an example, the transmission is wireless, although other transmission mediums and methods may also be suitable. A processor 108, which may be a micro-controller, digital signal processor (DSP), or other processing component, processes these various signals, such as for display on the computer system or transmission to other devices via the communication link. The processor 108 may also control transmission of information, such as cookies or IP addresses, to other devices.

Components of the computer system also include a system memory component (e.g., RAM), a static storage component (e.g., ROM), and/or a disk drive. The computer system performs specific operations by the processor 108 and other components by executing one or more sequences of instructions contained in the system memory component. Logic may be encoded in a computer readable medium, which may refer to any medium that participates in providing instructions to the processor 108 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples of the present disclosure, execution of instruction sequences (e.g., method 200, process flow 300, 350, or method 500) to practice the present disclosure may be performed by the computer system. In various other examples of the present disclosure, a plurality of the computer systems coupled by the communication link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of migrating memory, comprising:
   protecting, by a hypervisor, a first memory page from write operations, the first memory page being part of guest memory including a guest memory address allocated to a guest running on a virtual machine, the first memory page being used for direct memory access (DMA) by a device assigned to the virtual machine and stored at the guest memory address that maps to a first host-physical address, a second memory page being stored at the first host-physical address, and the device is allowed DMA in an input/output memory management unit (IOMMU);
   allocating a third memory page at a second host-physical address;
   after protecting the first memory page from write operations, copying data stored at the second memory page to the third memory page;
   updating a mapping including the guest memory address to reference the second host physical address;
   detecting that the first memory page is protected from write operations by the device;
   pinning the second memory page to main memory of a host machine; and
   storing the mapping from the guest memory address to the first host-physical address.

2. The method of claim 1, further comprising:
   receiving an indication to move the data from the first host-physical address to the second host-physical address.

3. The method of claim 2, wherein allocating the third memory page includes in response to receiving the indication, allocating the third memory page.

4. The method of claim 2, wherein the first host-physical address is located on a first node and the second host-physical address is located on a second node, and wherein receiving the indication includes detecting access to the first memory page by the second node.

5. The method of claim 4, wherein the first node and the second node are represented by Non-Uniform Memory Access (NUMA) nodes.

6. The method of claim 5, wherein one or more memory pages are moved between the first and second nodes.

7. The method of claim 2, wherein receiving the indication includes receiving a request to move the data stored at the first host-physical address.

8. The method of claim 1, further comprising:
   pinning, by the hypervisor, the second memory page to main memory of the host machine, the virtual machine and the hypervisor running in the host machine.

9. The method of claim 1, further comprising:
   identifying the mapping in a memory management unit (MMU) including one or more entries.

10. The method of claim 1, further comprising:
    receiving, by the hypervisor, a notification of a request by the device to access the first memory page, the notification being from the guest, and the hypervisor and the virtual machine running in the same host machine.

11. The method of claim 1, further comprising:
    allowing, by the hypervisor, the device access to the second memory page in accordance with the request; and
    after pinning the second memory page, determining that the second memory page is moveable from the first host-physical address.

12. The method of claim 1, wherein updating the mapping includes replacing the first host-physical address with the second host-physical address.

13. A system for migrating memory, comprising:
    a non-transitory memory; and
    one or more hardware processors coupled to the non-transitory memory and configured to read instructions from the non-transitory memory to cause the system to perform operations comprising:
    protecting a first memory page from write operations, wherein the first memory page is part of guest memory including a guest memory address allocated to a guest running on a virtual machine, wherein the first memory page is used for DMA by a device assigned to the virtual machine and stored at the guest memory address that maps to a first host-physical address, wherein a second memory page is stored at the first host-physical address, and wherein the device is allowed DMA in an input/output memory management unit (IOMMU),
    allocating a third memory page at a second host-physical address;
    copying data stored at the second memory page to the third memory page; and
    updating a mapping including the guest memory address to reference the second host-physical address;
    detecting that the first memory page is protected from write operations by the device;
    pinning the second memory page to main memory of a host machine; and
    storing the mapping from the guest memory address to the first host-physical address.

14. The system of claim 13, wherein the first host-physical address and the second host physical address are within random access memory (RAM) of the host machine.

15. The system of claim 13, wherein the first host-physical address and the second host physical address are on a same node.

16. The system of claim 13, wherein the first host-physical address and the second host-physical address are on different nodes.

17. The system of claim 13, the operations further comprising:
receiving a notification of a request by the device to access the first memory page;
detecting that the first memory page is protected from write operations by the device; and
pinning the second memory page to main memory of the host machine.

18. The system of claim 17, the operations further comprising:
storing the mapping from the guest memory address to the first host-physical address into a MMU, wherein the updating a mapping includes replacing the first host-physical address with the second host-physical address.

19. The system of claim 18, the operations further comprising:
allowing the device access to the second memory page in accordance with the request; and
determining that the second memory page is moveable from the first host-physical address.

20. A non-transitory machine-readable medium comprising a plurality of machine-readable instructions that when executed by one or more processors is adapted to cause the one or more processors to perform a method comprising:
protecting, by a hypervisor, a first memory page from write operations, the first memory page being part of guest memory including a guest memory address allocated to a guest running on a virtual machine, the first memory page being used for direct memory access (DMA) by a device assigned to the virtual machine and stored at the guest memory address that maps to a first host-physical address, a second memory page being stored at the first host-physical address, and the device is allowed DMA in an input/output memory management unit (IOMMU);
allocating a third memory page at a second host-physical address;
after protecting the first memory page from write operations, copying data stored at the second memory page to the third memory page;
updating a mapping including the guest memory address to reference the second host physical address;
detecting that the first memory page is protected from write operations by the device;
pinning the second memory page to main memory of a host machine; and
storing the mapping from the guest memory address to the first host-physical address.

\* \* \* \* \*